US009111442B2

(12) United States Patent
He et al.

(10) Patent No.: US 9,111,442 B2
(45) Date of Patent: Aug. 18, 2015

(54) ESTIMATING INCIDENT DURATION

(75) Inventors: Qing He, Ossining, NY (US); Klayut Jintanakul, Bankok (TH); Ioannis Kamarianakis, Yorktown Heights, NY (US); Laura Wynter, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/428,186

(22) Filed: Mar. 23, 2012

(65) Prior Publication Data

US 2013/0253808 A1 Sep. 26, 2013

(51) Int. Cl.
| | |
|---|---|
| G08G 1/01 | (2006.01) |
| G08G 1/07 | (2006.01) |
| G08G 1/09 | (2006.01) |
| G08G 1/097 | (2006.01) |
| G06Q 10/00 | (2012.01) |

(52) U.S. Cl.
CPC .............. *G08G 1/0104* (2013.01); *G06Q 10/00* (2013.01); *G08G 1/0116* (2013.01); *G08G 1/0133* (2013.01)

(58) Field of Classification Search
CPC ........ G07C 5/008; G07C 5/0808; G07C 5/00; G07C 5/006; G07C 5/0841; G07C 5/085; G07C 5/0866; G08G 1/00; G08G 1/01; G08G 1/065; G08G 1/097; G08G 1/07; G08G 1/09
USPC ......... 701/117, 118, 119, 421, 422, 423, 424; 180/167, 168
See application file for complete search history.

(56) References Cited

U.S. PATENT DOCUMENTS

| | | | | |
|---|---|---|---|---|
| 5,822,712 | A  * | 10/1998 | Olsson .......................... | 701/117 |
| 6,092,020 | A  * | 7/2000 | Fastenrath et al. ............ | 701/119 |
| 6,317,686 | B1 | 11/2001 | Ran | |
| 7,149,735 | B2 * | 12/2006 | Chaudhuri et al. ................... | 1/1 |
| 7,519,564 | B2 | 4/2009 | Horvitz | |
| 7,698,055 | B2 | 4/2010 | Horvitz et al. | |
| 7,739,040 | B2 * | 6/2010 | Horvitz ......................... | 701/414 |
| 8,139,820 | B2 * | 3/2012 | Plante et al. .................. | 382/104 |
| 2001/0005217 | A1* | 6/2001 | Hamilton et al. ............. | 348/148 |
| 2008/0319639 | A1 | 12/2008 | Yamane | |
| 2011/0043377 | A1 | 2/2011 | McGrath et al. | |
| 2011/0082636 | A1 | 4/2011 | Barker et al. | |

(Continued)

OTHER PUBLICATIONS

"Regression Models"; Introductory Statistics: Concepts, Models, and Applications; David W. Stockburger; http://www.psychstat.missouristate.edu/introbook/sbk16.htm.*

(Continued)

*Primary Examiner* — James Trammell
*Assistant Examiner* — James E Stroud
(74) *Attorney, Agent, or Firm* — Ryan, Mason & Lewis, LLP

(57) ABSTRACT

A method, an apparatus and an article of manufacture for incident duration prediction. The method includes obtaining incident data for at least one traffic-related incident in a selected geographic area, obtaining traffic data for the selected geographic area, spatially and temporally associating the at least one traffic-related incident with the traffic data to generate incident duration data for the at least one traffic-related incident, and predicting incident duration of at least one additional traffic-related incident based on the incident duration data for the at least one traffic-related incident.

20 Claims, 10 Drawing Sheets

(56) References Cited

U.S. PATENT DOCUMENTS

2011/0112747 A1 5/2011 Downs et al.
2011/0173015 A1 7/2011 Chapman et al.

OTHER PUBLICATIONS

"A regression-based method for mapping traffic-related air pollution: application and testing in four contrasting urban environments"; David J. Briggsa, Cornelis de Hoogh, John Gulliver, John Wills, Paul Elliott, Simon Kingham, Kirsty Smallbone; Science of the Total Environment vol. 253, Issues 1-3, May 15, 2000, pp. 151-167.*
"The relationship among highway geometrics, traffic-related elements and motor-vehicle accident frequencies"; John Milton and Fred Mannering; Transportation 25: 395-413, 1998.*
"Speed, speed limits and road traffic accidents under free flow conditions"; A.A.M Aljanahia, A.H Rhodes, A.V Metcalfeb,; Accident Analysis & Prevention vol. 31, Issues 1-2, Jan. 1999, pp. 161-168; http://www.sciencedirect.com/science/article/pii/S000145759800058X.*
"Quantile regression"; http://en.wikipedia.org/wiki/Quantile_regression; retrieved on Apr. 21, 2014.*
"Quantile regression provides a fuller analysis of speed data"; Paul Hewson; Accident Analysis & Prevention vol. 40, Issue 2, Mar. 2008, pp. 502-510; http://www.sciencedirect.com/science/article/pii/S0001457507001339.*
"Automatic Calibration of the Fundamental Diagram and Empirical Observations on Capacity"; Gunes Dervisoglu, Gabriel Gomes, Jaimyoung Kwon, Roberto Horowitz, Pravin Varaiya; For Presentation and Publication 88th Annual Meeting, Jan. 2009 Transportation Research Board Washington, D.C. Submitted Aug. 1, 2008.*
"New support vector algorithms"; B Schölkopf, AJ Smola, RC Williamson, PL Bartlett; Neural Computation 12, 1207-1245 (2000) c 2000 Massachusetts Institute of Technology; http://alex.smola.org/papers/2000/SchSmoWilBar00.pdf.*
"Rainfall effect on single-vehicle crash severities using polychotomous response models"; S Jung, X Qin, DA Noyce—Accident Analysis & Prevention vol. 42, Issue 1, Jan. 2010, pp. 213-224; http://www.sciencedirect.com/science/article/pii/S000145750900205X.*
"Quantile Regression Forests"; Nicolai Meinshausen; The Journal of Machine Learning Research vol. 7, Dec. 1, 2006 pp. 983-999; Publicaion Date Dec. 1, 2006; http://dl.acm.org/citation.cfm?id=1248582.*
Kim et al., Empirical Analysis and Modeling of Freeway Incident Duration, 2008 11th International IEEE Conference on Intelligent Transportation Systems.
Ruimin et al., Incident Duration Model on Urban Freeways Using Three Different Algorithms of Decision Tree, 2010 International Conference on Intelligent Computation Technology and Automation (ICICTA 2010).
Oh et al., Temporal Control of Variable Message Signs Toward Achieving Dynamic System Optimum, in Proceedings 79th Annual Meeting of TRB (CD-ROM), 2000.
Chin et al., Temporary Loss of Highway Capacity and Impacts on Performance: Phase 2, Oak Ridge, Tennessee: Oak Ridge National Laboratory, 2004.
CHP, 2011. CHP Traffic Incident Information Page, http://cad.chp.ca.gov/.
Giuliano, Incident Characteristics, Frequency, and Duration on a High Volume Urban Freeway, Transportation Research 23A: 387-396.
Guan et al., Traffic Incident Duration Prediction Based on Artificial Neural Network, in Proceedings of the IEEE International Conference on Intelligent Computation Technology and Automation, Changsha, China, 2010.
Hothorn et al., Unbiased Recursive Partitioning: A Conditional Inference Framework, Journal of Computational and Graphical Statistics 15: 651-674.
Hothorn et al., CRAN—Package Party, Party: A Laboratory for Recursive Partytioning, http://cran.r-project.org/web/packages/party/ 2012.
Kim et al., Empirical Analysis and Modeling of Freeway Incident Duration, In Proceedings of the 11th International IEEE Conference on Intelligent Transportation Systems, Beijing, China, 2008.
Lee et al., Defining the Incident Impact Area for Traffic Diversion: Knowledge Discovery via a Data Mining Approach, in Proceedings 82nd Annual Meeting of TRB (CD-ROM), Washington D.C., 2003.
Loh, Classification and Regression Tress, Wiley Interdisciplinary Reviews, Data Mining and Knowledge Discovery, 1: 14-23, 2011.
Guide Classification and Regression Trees and Forests (Version 11.4), 2011, http://www.stat.wisc.edu/~loh/guide.html.
Lv et al., A History Data Based Traffic Incident Impact Analyzing and Predicting Method, in Proceedings of the IEEE International Conference on Electronics and Information Engineering, Kyoto, Japan, 2010.
Morales et al., Analytical Procedures for Estimating Freeway Traffic Congestion, ITE Journal: 45-49, 1987.
Murthy, Automatic Construction of Decision Trees from Data: a Multi-Disciplinary Survey, Data Mining and Knowledge Discovery 2: 345-389, 1998.
R Development Core Team, R: A Language and Environment for Statistical Computing, Vienna, Austria: R Foundation for Statistical Computing, 2009.
Smith et al., Forecasting the Clearance Time of Freeway Accidents, Charlottesville, VA: Center for Transportation Studies, University of Virginia, 2001.
Srinivasan et al., Roles of Spatial and Temporal Factors in Variable Message Sign Effectiveness Under Nonrecurrent Congestion, Transportation Research Record: Journal of the Transportation Research Board 184: 124-134, 2003.
Therneau et al., Cran—Package Rpart, Rpart: Recursive partitioning, http://cran.r-projectorg/web/packages/rpart/index.html 2011.
Wei et al., Sequential Forecast of Incident Duration Using Artificial Neural Network Models, Accident Analysis and Prevention 39 (5):944-54, 2007.
Choe et al., Freeway Performance Measurement System: Operational Analysis Tool, Transportation Research Record, Journal of the Transportation Research Board, 1811: 67-75, 2002.
Hyndman, Business Forecasting Methods, Nov. 8, 2009, p. 1-4.
Classification and Regression Trees, 36-350, Data Mining, Nov. 6, 2009.
Chassiakos et al., Smoothing Algorithms for Incident Detection, Transportation Research Record: Journal of the Transportation Research Board 1394: 8-16, 1993.
Chung, Development of Spatio-Temporal Accident Impact Estimation Model for Freeway Accident Management, Department of Civil Engineering, University of California Irvine, 2007.
Chung, Development of an Accident Duration Prediction Model on the Korean Freeway Systems, Accident Analysis and Prevention 42: 282-289, 2010.
Chung et al., Modeling Accident Duration and its Mitigation Strategies on South Korean Freeway Systems, Transportation Research Record: Journal of the Transportation Research Board, 2178: 49-57, 2010.
Demiroluk et al., Structure Learning for the Estimation of Non-Parametric Incident Duration Prediction Models, in Proceedings 90th Annual Meeting of TRB (CD-ROM), Washington D.C. 2011.
Garib et al., Estimating Magnitude and Duration of Incident Delays, Journal of Transportation Engineering 123 (6): 459-466, 1997.
Golob et al., An Analysis of Truck Involved Freeway Accidents Using Linear Modeling, Journal of Safety Research 18: 121-136, 1987.
Jones et al., Analysis of the Frequency and Duration of Freeway Accidents in Seattle, Accident Analysis and Prevention 23: 239-255, 1991.
Khattak et al., A Simple Time Sequential Procedure for Predicting Freeway Incident Duration, IVHS Journal 1: 1-26, 1994.

(56) References Cited

OTHER PUBLICATIONS

Koenker et al., Quantile Regression, Journal of Economic Perspectives, vol. 15, No. 4, Fall 2001, pp. 143-156, 2005.

Lee et al., A Computerized Feature Selection Method Using Genetic Algorithms to Forecast Freeway Accident Duration Times, Computer-Aided Civil and Infrastructure Engineering 25 (2): 132-148, 2010.

Nam et al., An Exploratory Hazard-Based Analysis of Highway Incident Duration, Transportation Research Part A 34: 85-102, 2000.

Ozbay et al. Incident Management in Intelligent Transportation Systems, 1999.

Payne et al. Freeway Incident-Detection Algorithms Based on Decision Trees with States, Transportation Research Record: Journal of the Transportation Research Board 682: 30-37, 1978.

Qi et al., Identifying Nearest Neighbors in a Large-Scale Incident Data Archive, Transportation Research Record: Journal of the Transportation Research Board 1879:89-98, 2004.

Qi et al., An Information-Based Time Sequential Approach to Online Incident Duration Prediction, Journal of Intelligent Transportation Systems 12 (1): 1-12, 2008.

Skabardonis et al., I-880 Field Experiment: Analysis of Incident Data, Transportation Research Record 1603, 1997.

Witten et al., Data Mining: Practical Machine Learning Tools and Techniques, 2nd ed. San Francisco: Morgan Kaufman, 2005.

\* cited by examiner

OFFLINE MODEL CALIBRATION STEPS

REAL-TIME, ONLINE STEPS

ESTIMATING INCIDENT DURATION

FIELD OF THE INVENTION

Embodiments of the invention generally relate to information technology, and, more particularly, to incident management.

BACKGROUND

Incidents, including accidents, vehicle breakdowns, spills, and/or other random events, reduce the capacity of the road and cause congestion when traffic demand exceeds the reduced capacity at the incident location. Effective management is needed for mitigating the negative effects of incidents on congested roads and freeways.

Existing incident management systems generally encompass modules including incident detection algorithms, incident impact prediction, and incident-responsive traffic management and control. Incident duration prediction is a component of the latter two modules. Incident duration prediction refers to the ability to anticipate essential incident characteristics such as duration, and allows traffic managers to make improved decisions on how to use management and control resources.

An incident includes the following phases: (a) incident detection and reporting time, (b) response time, (c) clearance time, and (d) recovery time. Incident duration is typically defined as the sum of first three phases; that is, it is the duration between the instances of incident occurrence and of departure of the response vehicles from the accident scene.

In general, the impact of an incident in terms of both magnitude and extent of congestion is significantly affected by incident duration. Because duration is unknown until the incident is cleared, an accurate means of estimating incident duration is needed for real-time prediction of incident impacts, deriving effective response management and control strategies, etc.

SUMMARY

In one aspect of the present invention, techniques for estimating incident duration are provided. An exemplary computer-implemented method for incident duration prediction can include steps of obtaining incident data for at least one traffic-related incident in a selected geographic area, obtaining traffic data for the selected geographic area, spatially and temporally associating the at least one traffic-related incident with the traffic data to generate incident duration data for the at least one traffic-related incident, and predicting incident duration of at least one additional traffic-related incident based on the incident duration data for the at least one traffic-related incident.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
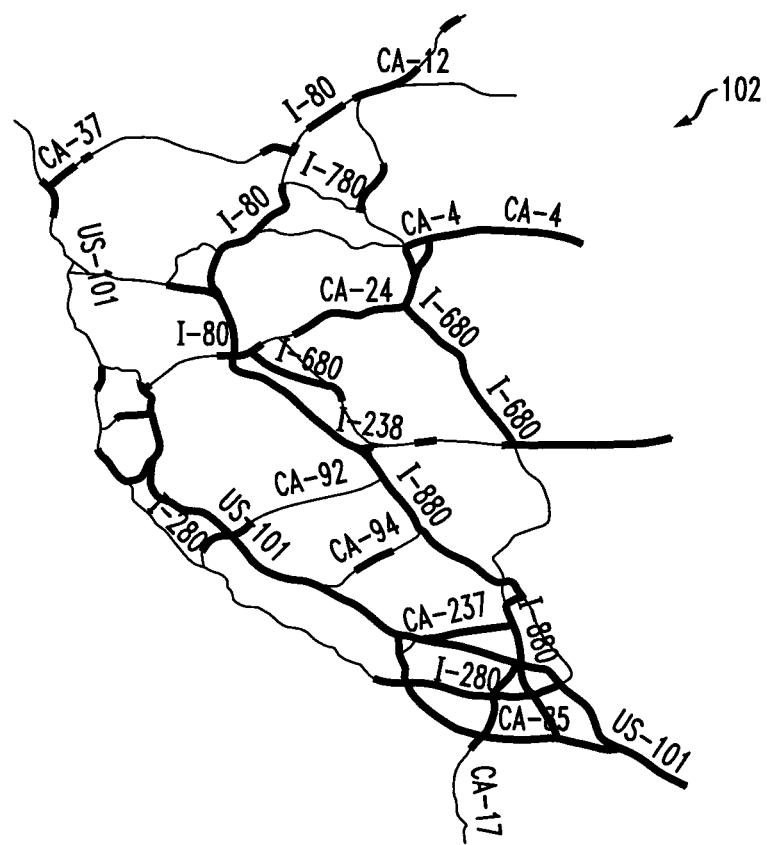
FIG. 1 is a diagram illustrating an example of a Bay area freeway network with detectors in highlighted links, according to an embodiment of the present invention.

As described herein, an aspect of the present invention includes predicting incident characteristics for real-time network command and control. At least one embodiment of the invention includes a modeling framework for incident duration prediction. The resulting models are interpretable and uncover nonlinear associations between traffic- and incident-related predictors of duration.

The techniques described herein include incorporating traffic data from both before and after the incident occurrence. Traffic data collected prior to incidents can reflect environmental conditions and act as spatial and temporal indicators. For example, with respect to possible spatial indicators, sequential traffic measurements can indicate if the location of an incident is a bottleneck in the network. Also, with respect to possible example temporal indicators, time of day and day of week can be associated with different levels of traffic variables and, consequently, with different effects for incidents of the same type. Further, the levels of traffic variables after an incident can be associated with incident severity and hence with clearance times.

An example embodiment of the invention includes a hybrid predictive model that combines unbiased algorithms for recursive partitioning based on permutation tests with quantile regression models. In contrast to disadvantageous existing approaches, embodiments of the invention include overcoming over-fitting and selection bias towards predictors with many possible splits or missing values.

At least one embodiment of the invention includes employing regression trees, which are similar to classification trees except that a regression model is fitted to each final node of the tree to give the predicted values of incident duration. Because the total model complexity is shared between the tree structure and the set of node models, interpretability of the tree structure is improved as the complexity of the node models increases. Therefore, a modeler may choose a predictive model from a set of alternatives that are close in terms of predictive power by trading off tree structure complexity (which is expected to be significant in the presence of continuous predictors such as traffic variables) against node model complexity.

In accordance with at least one embodiment of the invention, the tree structure is estimated using methodology which combines unbiased recursive partitioning (URP) with piecewise constant fitting using permutation tests. The conditional distribution of statistics measuring the association between incident duration and its predictors is the basis for an unbiased selection of the predictors in the model. Multiple statistical tests such as, for example, analysis of variance (ANOVA) significance tests, are applied to determine significant associations between predictors and incident duration.

The estimated models at the final nodes belong to the general class of quantile regression and use traffic variables and their (multiplicative) interactions as predictors. Quantile regression models are robust to outliers and skewed response distributions. Unlike conventional regression models, which concentrate on the relationship between the response and the covariates at the centre of the response distribution, quantile regression can provide insight into the nature of that relationship at the center as well as the tails of the response distribution. In an example application used for illustrative purposes described herein, a focus was placed on the 0.5 (median regression) and the 0.9 quantiles of log-duration. Median regression models can be used as conventional incident duration predictors, while models for the 0.9 conditional quantile quantify the uncertainty associated with each prediction and can also be viewed as predictors of worst-case scenarios.

By way of illustrative, the predictive performance of an example embodiment of the invention is compared against: a) the Classification and Regression Tree (CART) algorithm, and b) k-nearest neighbor (k-NN) algorithm based on the distance metric of and without using predictors based on traffic data. The set of measures of predictive accuracy includes mean absolute error (MAE1), median absolute error (MAE2), mean absolute percentage error (MAPE1) and median absolute percentage error (MAPE2). Also presented are percentages of predictions that are within a certain tolerance of their actual duration times.

FIG. 1 is a diagram illustrating an example of a Bay area freeway network 102 with detectors in highlighted links, according to an embodiment of the present invention. By way of illustration and example, incidents that occurred in 17 major freeways in the Bay area, California, from April to June, 2010 were examined. The freeway network shown in FIG. 1 connects ten cities. Incident data were obtained from the California Highway Patrol computer aided dispatch (CHP/CAD) system. Incident information was to collected from two sources: the first source provided the incident type and the corresponding spatio-temporal information, while the second source provided further details on incident characteristics, such as number of vehicles involved.

In this example, original incident types were classified into three groups: collision, disabled vehicle and traffic hazard. In total, 1245 incidents with valid data were analyzed. Table 1 (below) contains the basic summary statistics of the dataset. The empirical probability distribution of incident duration has a long tail. The average incident duration was 20.61 minutes, while the median incident duration was 15.5 minutes. The set of incidents was randomly cut into a training dataset (60 percent of the data) and test dataset (40 percent of the data).

Additionally, traffic data were obtained from the Caltrans Performance Measurement System (PeMS). PeMS is a system designed to maintain California freeway traffic data and compute annual congestion for facilities with surveillance systems in place, typically loop detectors spaced approximately 0.5 mile apart on each freeway lane. There are around 850 detectors in Bay area freeways, shown as highlighted/bold links in FIG. 1. The example analysis that follows uses 5-minute aggregated volume, speed, and occupancy data. Each incident was associated with traffic data spatially and temporally.

Spatially, each incident was matched with the closest link that satisfied the incident location descriptions. Upstream and downstream traffic detectors were also identified accordingly. Temporally, a modified incident detection algorithm based on the DELOS (also called Minnesota) algorithm was developed to trace differences in occupancy between adjacent detectors through time and to detect an incident when these differences change significantly in a short time period. This incident detection algorithm associates incident data with upstream and downstream traffic data, locates the time stamp when the shockwave hits the nearest upstream detector, and records traffic data before and after the incident's time of occurrence.

Table 1 depicts summary statistics of traffic data before and after the incident.

TABLE 1

| Incident data | |
|---|---|
| Number of incidents | 1245 |
| Median incident duration (min) | 15.5 |
| Average incident duration (min) | 20.61 |
| Proportion of incidents in "Collision" | 0.52 |
| Proportion of incidents in "Disabled" | 0.26 |
| Proportion of incidents in "Hazard" | 0.22 |
| Proportion of incidents with injuries | 0.08 |
| Average number of vehicle involved | 1.30 |
| Traffic data | |
| Average historical speed across all incident sites (mph) | 52.84 |
| Average historical volume across all incident sites (veh/hr/ln) | 1361 |
| Average historical occupancy across all incident sites | 0.139 |
| Average speed before incident (mph) | 48.75 |
| Average speed after incident (mph) | 29.27 |
| Average volume before incident (veh/hr/ln) | 1303 |
| Average volume after incident (veh/hr/ln) | 1300 |
| Average occupancy before incident | 0.147 |
| Average occupancy after incident | 0.316 |

Prior knowledge suggests that incidents will cause congestion on an upstream detector, whereas traffic conditions will become less congested at downstream stations. In an example embodiment of the invention, speed and occupancy are found to be affected dramatically by incidents, while volume remains relatively stable. In the illustrative example detailed herein, on average, speed drops 40% after an incident, while occupancy increases by 115%.

Figure 2:
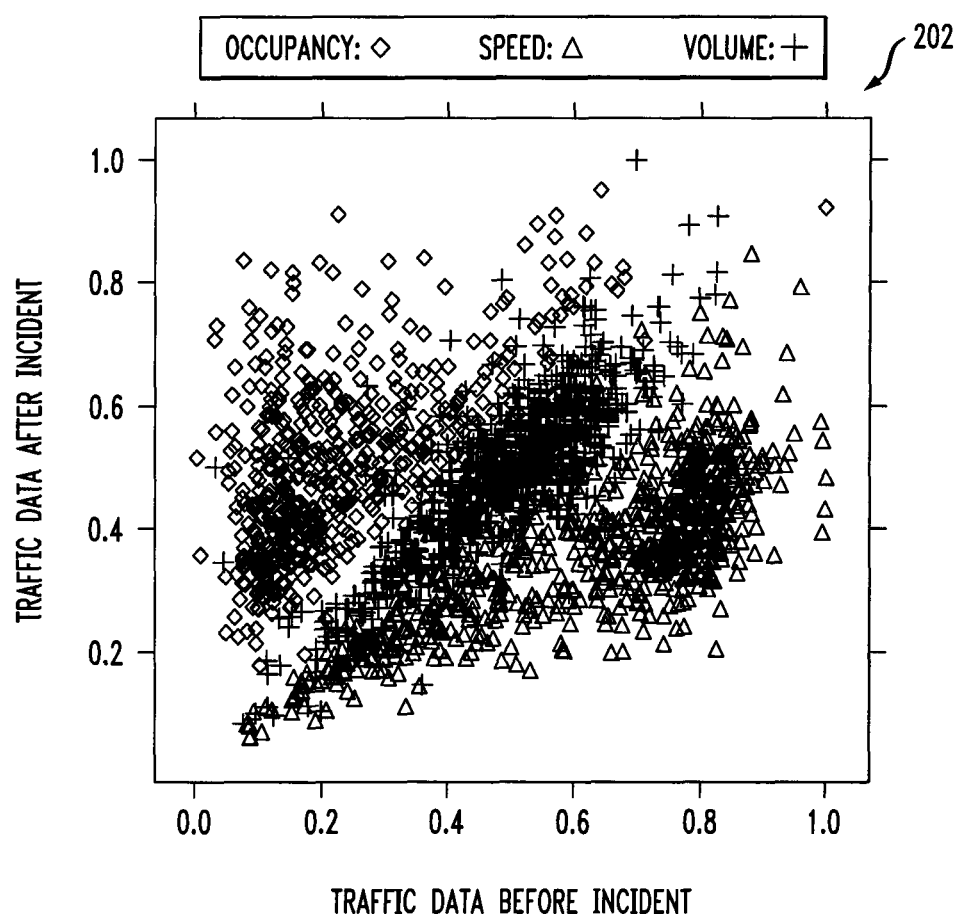
FIG. 2 is a diagram illustrating example scatter-plots of normalized traffic data at the first upstream detector before and after incident occurrence, according to an embodiment of the present invention.

The impact of incidents on traffic data is illustrated in FIG. 2. FIG. 2 is a graph 202 illustrating example scatter-plots of normalized traffic data (speed, volume and occupancy) at the first upstream detector before and after incident occurrence, according to an embodiment of the present invention. Speeds, volumes and occupancies at the first upstream detector before and after an incident's time of occurrence are normalized and plotted in the same graph. Points on the 45 degree line correspond to data that are not affected by an incident. Note that speeds tend to decrease while occupancies tend to increase after the incident. On the other hand, volumes may increase or decrease, depending on the levels of traffic congestion before and after the incident.

Independent variables are outlined in Table 2.

after incident detection at a first upstream detector, according to an embodiment of the present invention. By way of illustration, occupancy range is measured by occupancy differences, that is, $Occ(s,t)-Occ(s,t-1)$, where section s indicates the first upstream detector, and t is the time when the incident-induced impact is observed. Each violin-type plot represents the empirical probability density of incident duration at different ranges of occupancy.

As illustrated, the variability of incident duration increases as the magnitude of shocks in occupancy increase. Also, low occupancy ranges are associated with short incident durations, while high occupancy increments may be related to both short and long incident durations. This suggests that traffic data may provide significant predictive power for incident duration. In addition, note an increasing relationship between incident duration and the number of vehicles involved in an incident, further detailed in FIG. 4.

Figure 4:
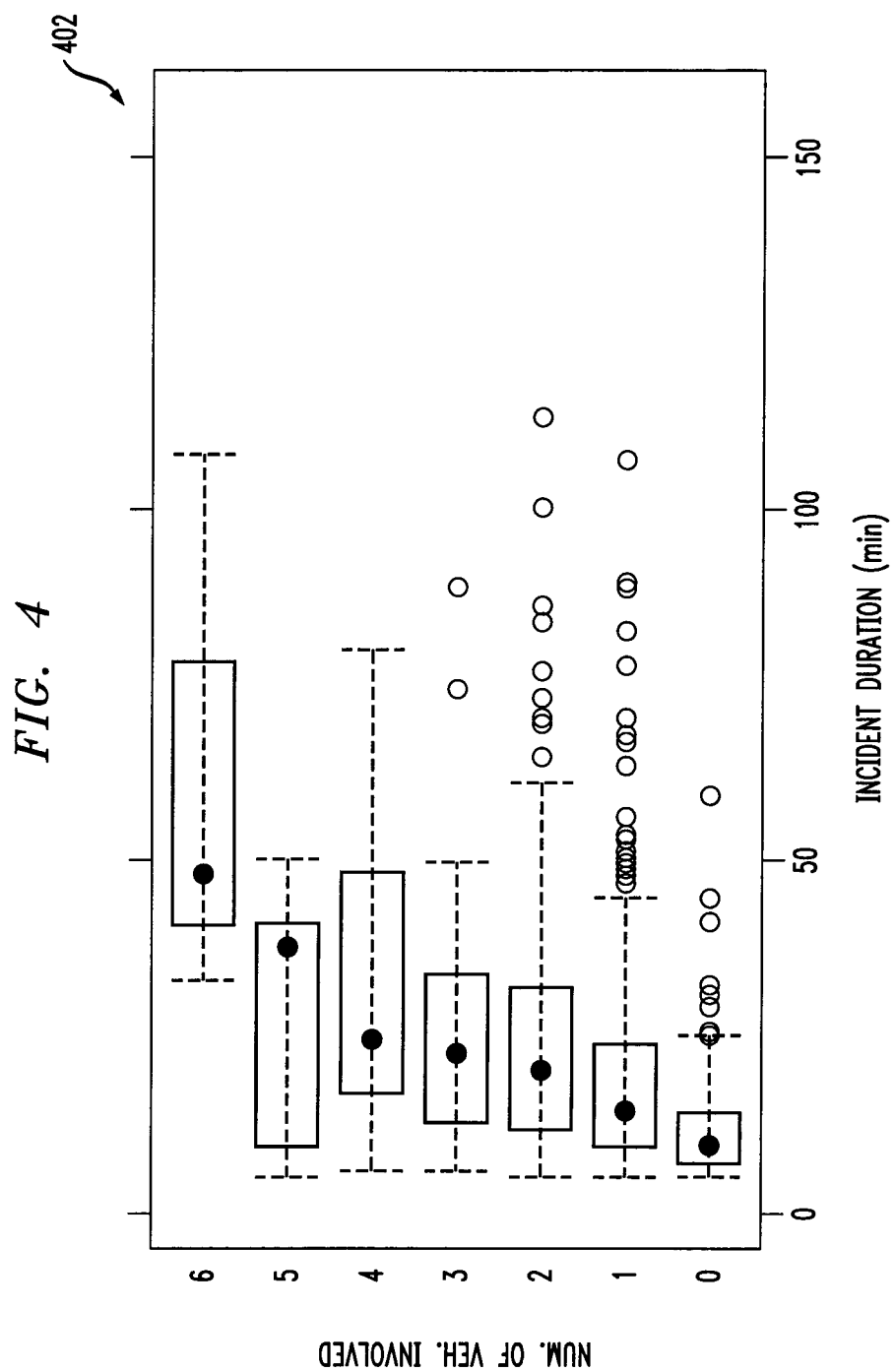
FIG. 4 is a diagram illustrating example box-plots of incident duration for different numbers of vehicles involved, according to an embodiment of the present invention.

FIG. 4 is a graph 402 illustrating example box-plots of incident duration for different numbers of vehicles involved in an incident of type "collision," according to an embodiment of the present invention. The number of vehicles

TABLE 2

| Information type | Independent variables | Notation |
|---|---|---|
| Weather characteristics | Rainy | rain |
| | Snowy | snow |
| Temporal characteristics | Time of day (AM, PM, Mid, Off-peak) | t_am, t_pm, t_mid, t_off |
| | Day of week (Weekday or not) | weekday |
| Incident characteristics | Incident type (collision, disabled or hazard) | type |
| | Num of vehicles involved | num_veh |
| | Lanes blocked (binary) | lane_block |
| | Truck involved (binary) | truck |
| | Person injured (binary) | injured |
| Geometric characteristics | Freeway (CA-17, CA-237, CA-24, CA-242, CA-4, CA-84, CA-85, CA-87, CA-92, I-238, I-280, I-580, I-680, I-80, I-880, I-980, US-101) | freeway1~freeway17 |
| | City (Castro Valley, Contra Costa, Dublin, Hayward, Marin, Oakland, Redwood City, San Francisco, San Jose, Solano) | city1~city10 |
| | Interstate highway | interstate |
| | Ramp exists near incident location (upstream/downstream on-ramp/off-ramp; binary) | uponramp, upofframp, downonramp, downofframp |
| | Upstream off-ramp and a downstream on-ramp exist near incident location (binary) | junction |
| | Upstream on-ramp and/or downstream off-ramp exist near incident location (binary) | junctionbwt |
| | number of lanes (2 or 3, 4, 5+) | ln23, ln4, ln5 |
| Traffic characteristics | Historical mean of traffic data (speed, volume and occupancy) at the time of incident | v_mean, q_mean, o_mean |
| | Traffic data at the first upstream detector before incident detection | v_prior, q_prior, o_prior |
| | Traffic data at the first upstream detector after incident detection | v_inc, q_inc, o_inc |
| | Traffic data after incident occurrence divided by measurements collected before incident occurrence | v_ratio, q_ratio, o_ratio |
| | Traffic data increments after incident occurrence | v_diff, q_diff, o_diff |

Figure 3:
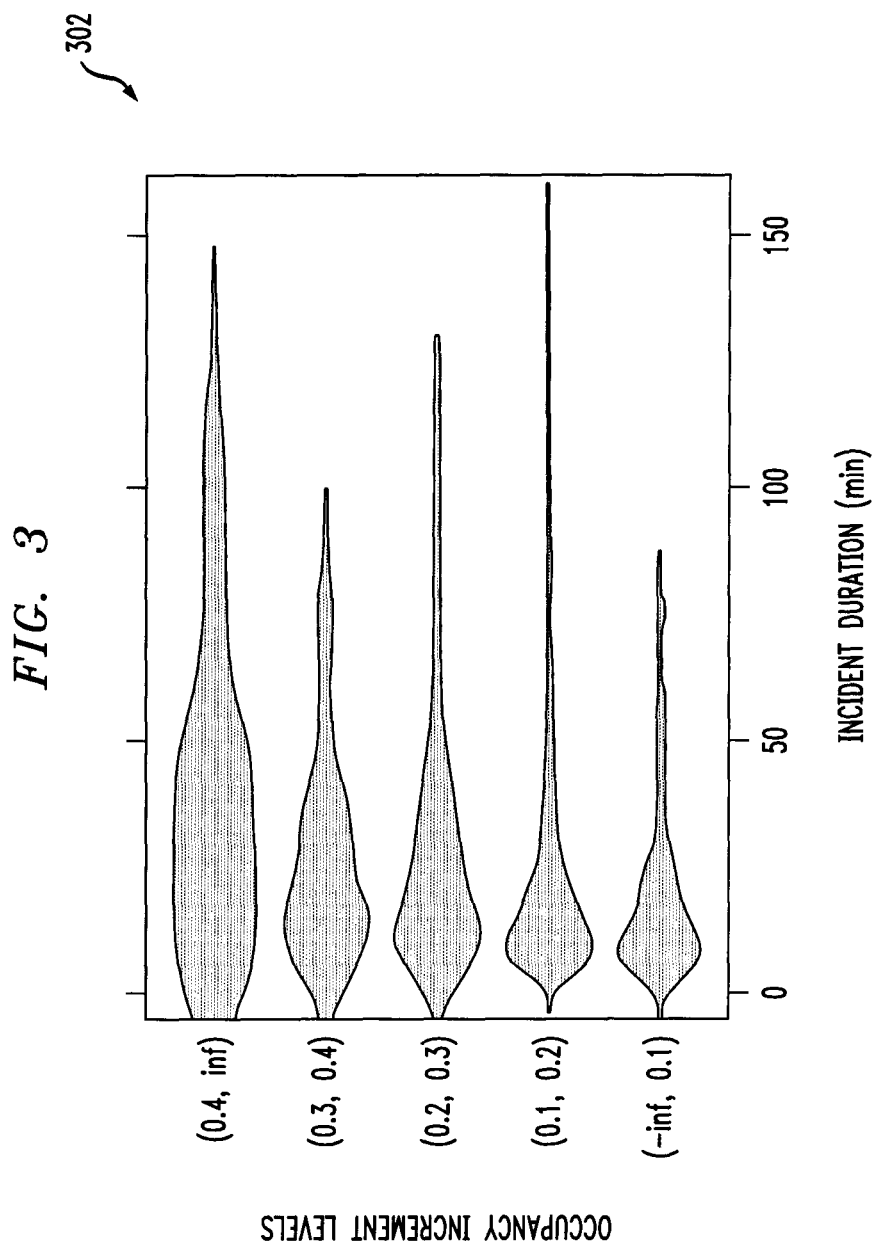
FIG. 3 is a diagram illustrating empirical distributions of incident duration for different occupancy increment levels after incident detection at a first upstream detector, according to an embodiment of the present invention.

As noted, independent variables are categorized into five groups in Table 2: weather characteristics, temporal characteristics, incident characteristics, geometric characteristics and traffic characteristics. Variables are selected by analysis of variance (ANOVA) significance tests. All incident-related variables are categorical except for the number of vehicles involved in the incident. FIG. 3 depicts a heteroscedastic relationship between incident duration and occupancy range.

FIG. 3 is a graph 302 illustrating empirical distributions of incident duration for different occupancy increment levels involved in a collision-type incident may be one of the variables used in the techniques described herein.

Additionally, in accordance with the example embodiment detailed herein, two trees were built based on different sets of predictors. The first tree, referred to as URP tree1 is shown in FIG. 5, while the second tree, referred to as URP tree2, is shown in FIG. 6.

Figure 5:
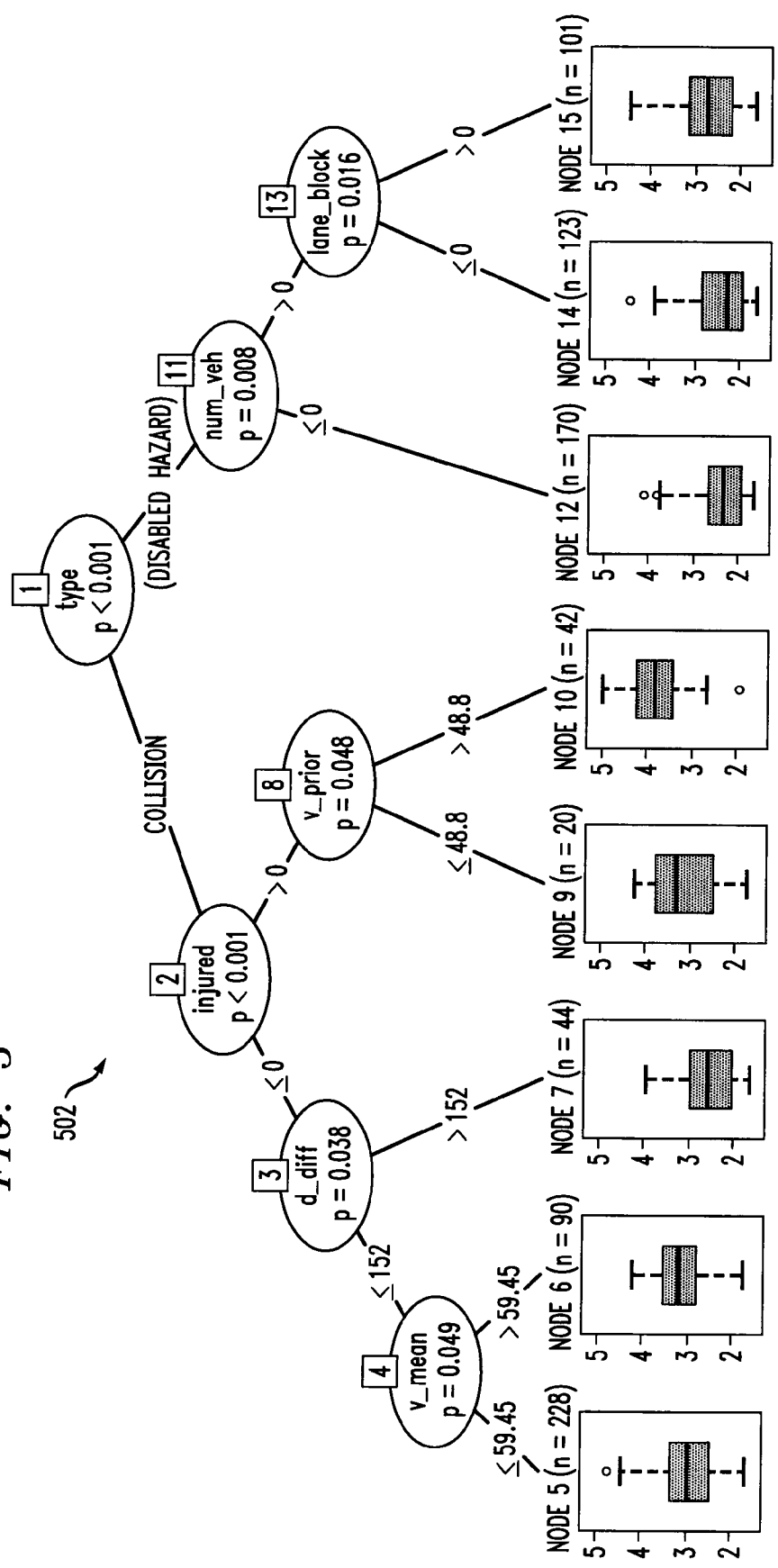
FIG. 5 is a diagram illustrating an example unbiased recursive partition tree using all candidate predictors in training data, according to an embodiment of the present invention.

Accordingly, FIG. 5 is a diagram illustrating an example unbiased recursive partition tree 502 using all candidate predictors in training data, according to an embodiment of the present invention. As noted, FIG. 5 depicts URP tree1 (with traffic data). URP tree1 was created using all candidate variables in Table 2. For each inner node, the Bonferroni-adjusted p-values are given. A box-plot of the log of incident duration is displayed in each terminal node, and MAPE1 for URP tree1 equals 53.77%.

Figure 6:
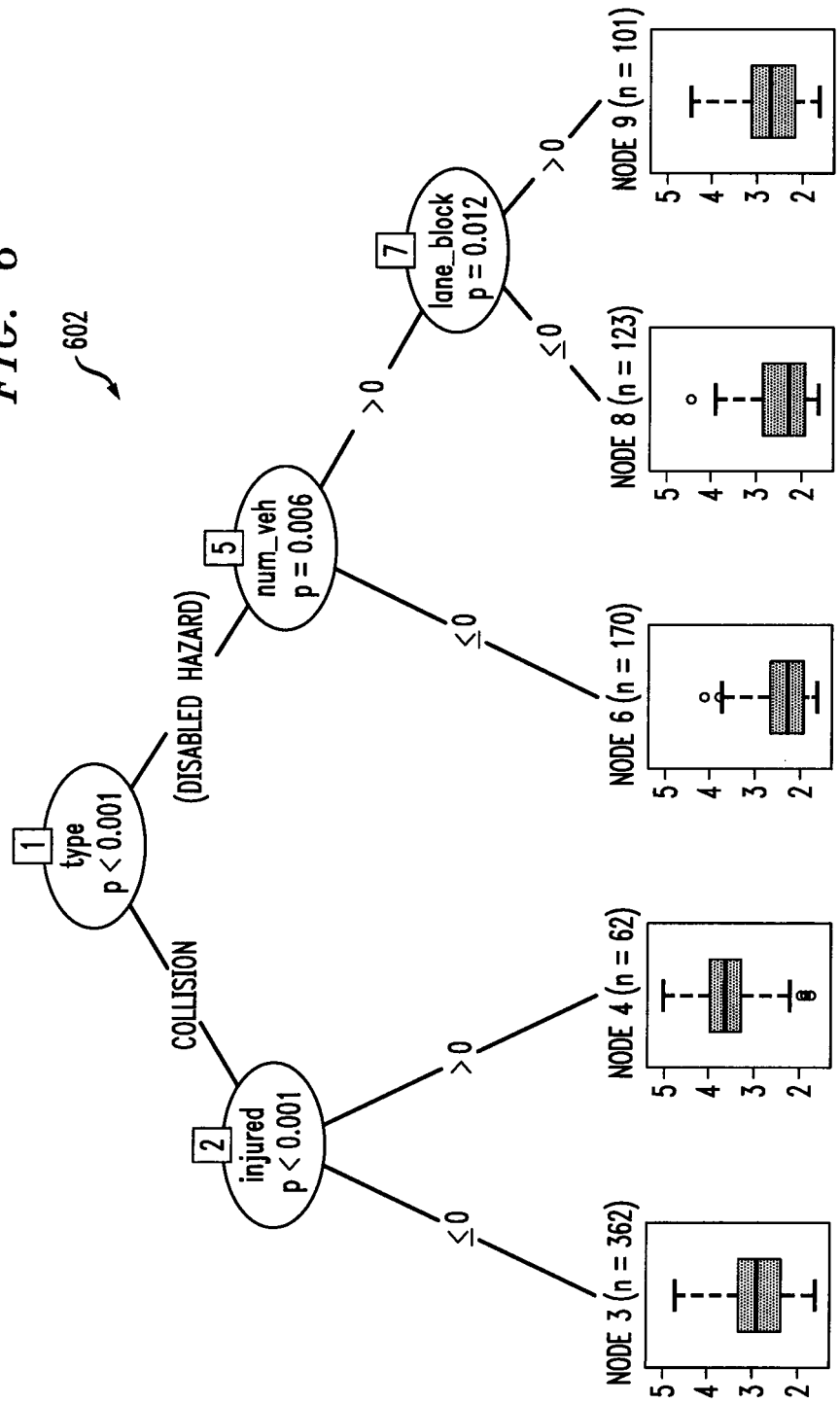
FIG. 6 is a diagram illustrating an example unbiased recursive partition tree using only categorical variables in training data, according to an embodiment of the present invention.

FIG. 6 is a diagram illustrating an example unbiased recursive partition tree 602 using only categorical variables in training data, according to an embodiment of the present invention. As noted, FIG. 6 depicts URP tree2 (without traffic data). URP tree2 was obtained using all variables except traffic variables. For each inner node, the Bonferroni-adjusted p-values are shown. A box-plot of the log of incident duration is displayed in each terminal node, and MAPE1 for URP tree1 equals 56.41%.

The decision path suggested by each tree is followed by answering a yes or no question at each node. Given an incident associated with traffic data, the attribute of the incident or traffic data is examined in the node. The path to the next node is determined by matching the condition on the arc, where a question may be whether the value of the traffic data is above or below a given value. The values are determined by the techniques detailed herein (see, for example, FIG. 5). Eventually, at each terminal node, a prediction is made based on the mean of incident duration of the data in that category.

According to the p-values in each node in both URP tree1 and URP tree2, the most significant predictors are incident characteristics (type, injured, num_veh and lane_block). In both trees, the first node separates incidents according to type. In the case of traffic collisions, the second node divides incidents according to the presence or lack of an injury. In the URP tree with traffic data, URP tree1, if both a collision and injury occur, v_prior, the level of speed prior to an incident, divides the dataset further. Accordingly, collisions with injuries and high prior speeds (>48.8 miles per hour (mph)) are related to longer incident durations. High speeds prior to the incident are often associated with off-peak periods, and severe off-peak incidents may be expected to last longer due to fewer available response units.

Further, with regard to URP tree1 and URP tree2, node 3 indicates that a large reduction in traffic volume is associated with elevated incident duration. Additionally, node 4 uses historical time-of-day average speed to split incidents. Relatively low historical speeds correspond to peak-periods, which tend to have shorter incident duration. In Node 11, incidents with disabled vehicles (num_veh=1) have longer expected duration than traffic hazards (num_veh=0). Node 13 shows that information on blocked lanes is significant for duration prediction with disabled vehicles.

To gain better prediction accuracy, at least one embodiment of the invention includes building quantile regression models for each terminal node in URP tree2. Table 3 shows the coefficients of the six estimated regression models for the 0.5 (median) and 0.9 quantiles of the logarithm of incident duration.

TABLE 3

Coefficients of regression models estimated at each terminal node of URP tree2.

| Regressor | Value | Std. Error | t value |
|---|---|---|---|
| 0.5 quantile | | | |
| Node 3 | | | |
| constant | 2.16733 | 0.49004 | 4.42272 |
| city9 | 0.24735 | 0.10166 | 2.43308 |
| — | — | — | — |
| o_mean | 2.67317 | 1.24389 | 2.14905 |
| v_prior | 0.00884 | 0.00578 | 1.52861 |
| o_prior | 2.94948 | 1.26688 | 2.32815 |
| — | — | — | — |
| q_diff | 0.00069 | 0.00027 | 2.51226 |
| o_diff | 1.35123 | 0.67903 | 1.98995 |
| Node 4 | | | |
| v_diff | 0.0175 | 0.0144 | 1.2180 |
| v_prior | 0.0566 | 0.0074 | 7.6151 |
| o_prior | 6.6888 | 1.3426 | 4.9818 |
| city8 | −0.8139 | 0.3257 | −2.4987 |
| city2 | 0.5440 | 0.2358 | 2.3071 |
| Node 6 | | | |
| constant | 1.7954 | 0.1688 | 10.6352 |
| junction | 0.6095 | 0.1287 | 4.7376 |
| uponramp | 0.2327 | 0.1087 | 2.1402 |
| upofframp | −0.4717 | 0.1057 | −4.4644 |
| v_prior | 0.0060 | 0.0028 | 2.1330 |
| Node 8 | | | |
| constant | 1.7715 | 0.2757 | 6.4263 |
| t_mid | 0.4259 | 0.1787 | 2.3832 |
| t_off | 0.6355 | 0.2892 | 2.1977 |
| t_pm | 0.2677 | 0.1373 | 1.9501 |
| junction | 0.2560 | 0.1296 | 1.9751 |
| downonramp | −0.2272 | 0.1599 | −1.4208 |
| city6 | 0.3466 | 0.2346 | 1.4772 |
| q_mean | 0.0002 | 0.0002 | 1.5193 |
| o_diff | 1.7876 | 1.0319 | 1.7324 |
| Node 9 | | | |
| constant | 1.6724 | 0.6992 | 2.3918 |
| weekday | −0.5759 | 0.2481 | −2.3209 |
| interstate | −0.6921 | 0.2970 | −2.3303 |
| truck | 0.4832 | 0.2702 | 1.7882 |
| uponramp | −0.2953 | 0.1660 | −1.7790 |
| freeway12 | 0.3397 | 0.2504 | 1.3564 |
| v_prior | 0.0198 | 0.0087 | 2.2799 |
| o_prior | 4.8327 | 1.7361 | 2.7836 |
| o_diff | 2.5521 | 1.3578 | 1.8796 |
| 0.9 quantile | | | |
| Node 3 | | | |
| t_am | 0.69457 | 0.19808 | 3.50648 |
| t_md | 0.88465 | 0.17198 | 5.14382 |
| t_pm | 0.74222 | 0.19312 | 3.84326 |
| q_mean | 0.00056 | 0.0002 | 2.83477 |
| o_mean | −3.3821 | 1.1396 | −2.9678 |
| v_prior | 0.02485 | 0.00457 | 5.44163 |
| o_prior | 6.91505 | 1.13213 | 6.10799 |
| o_diff | 2.67348 | 0.78754 | 3.39472 |
| Node 4 | | | |
| interstate | 0.4334 | 0.3388 | 1.2792 |
| o_diff | 3.1075 | 1.5401 | 2.0177 |
| v_prior | 0.0426 | 0.0071 | 5.9916 |
| o_prior | 7.9935 | 1.7221 | 4.6418 |
| city8 | −0.8302 | 0.3984 | −2.0837 |
| Node 6 | | | |
| constant | 2.8679 | 0.1357 | 21.1301 |
| junction | 0.8737 | 0.2749 | 3.1787 |
| junctionbwt | 0.5531 | 0.2895 | 1.9109 |
| upofframp | −1.1451 | 0.2178 | −5.2583 |
| downonramp | 0.3267 | 0.1980 | 1.6497 |

TABLE 3-continued

Coefficients of regression models estimated
at each terminal node of URP tree2.

| Regressor | Value | Std. Error | t value |
|---|---|---|---|
| Node 8 | | | |
| constant | 3.7102 | 0.3994 | 9.2896 |
| junction | 1.2756 | 0.4000 | 3.1891 |
| upofframp | −1.1815 | 0.3823 | −3.0906 |
| downonramp | −0.8234 | 0.3498 | −2.3537 |
| downofframp | −0.8556 | 0.4051 | −2.1121 |
| city6 | 0.3029 | 0.1863 | 1.6260 |
| v_diff | 0.0110 | 0.0057 | 1.9181 |
| q_diff | −0.0007 | 0.0004 | −2.0189 |
| o_diff | 2.4608 | 1.4465 | 1.7012 |
| Node 9 | | | |
| constant | 3.6738 | 0.1235 | 29.7529 |
| uponramp | −0.4549 | 0.1742 | −2.6114 |

Besides traffic characteristics, geometric characteristics appear in most of the estimated regression models, such as ramp, city and freeway junction information. This implies that incident duration varies significantly for different geometry factors, as well as different jurisdictions. For example, incidents that happen in freeway junctions are related to increased clearance times, while the presence of an upstream off-ramp may decrease incident duration.

Also, by way of illustration, a hybrid tree-based quantile regression model was built based on URP tree2 and compared with CART and KNN. The latter do not leverage traffic data in accordance with what was observed in earlier studies.

Figure 7:
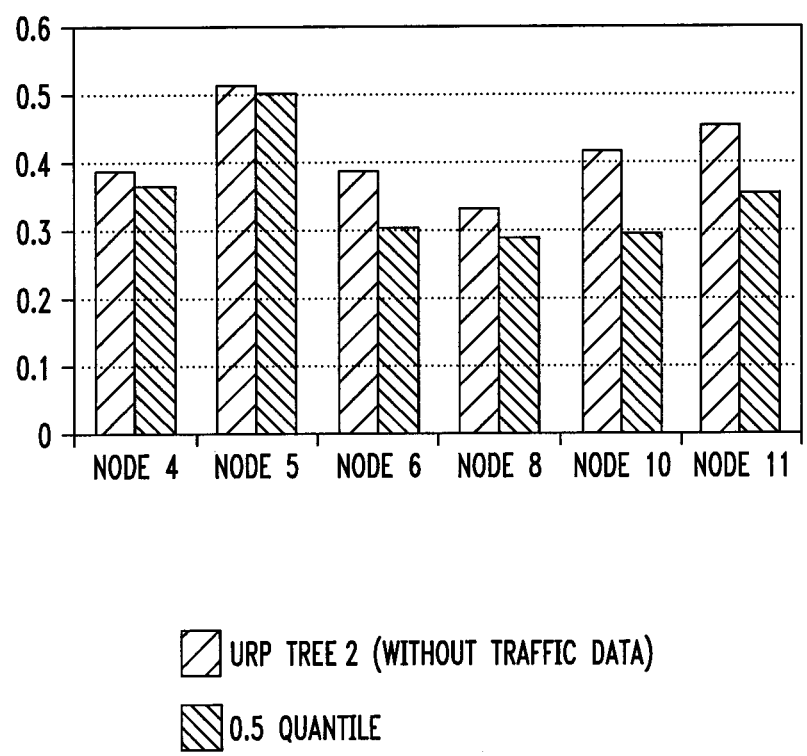
FIG. 7 is a diagram illustrating comparisons of median absolute percentage error (MAPE2) for unbiased recursive partitioning tree2 (URPtree2) with and without median regressions in terminal nodes, according to an embodiment of the present invention.

By replacing the mean in the final nodes of tree2 by quantile regression models, the forecasting accuracy (measured by MAPE2) on each terminal node was improved on average by 15%, as can be further observed in FIG. 7, which is a graph 702 illustrating comparisons of MAPE2 for URPtree2 with and without median regressions (that use traffic data as predictors) in terminal nodes, according to an embodiment of the present invention.

Figure 8:
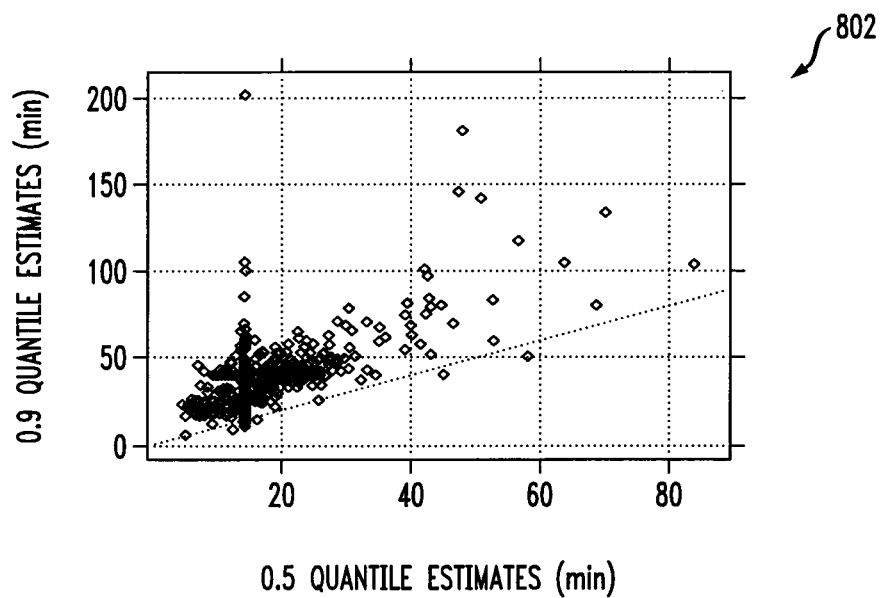
FIG. 8 is a diagram illustrating example comparisons of predictions based on 0.5 and 0.9 quantile regressions, according to an embodiment of the present invention.

FIG. 8 is a graph 802 illustrating example comparisons of predictions based on 0.5 and 0.9 quantile regressions, according to an embodiment of the present invention. To better visualize the difference between 0.5 and 0.9 quantile estimates, the corresponding predictions are plotted in FIG. 8; the average ratio of 0.9 and 0.5 quantile estimates is 2.29, which indicates traffic operators should be prepared for a doubled incident clearance time in the worst cases.

Figure 9:
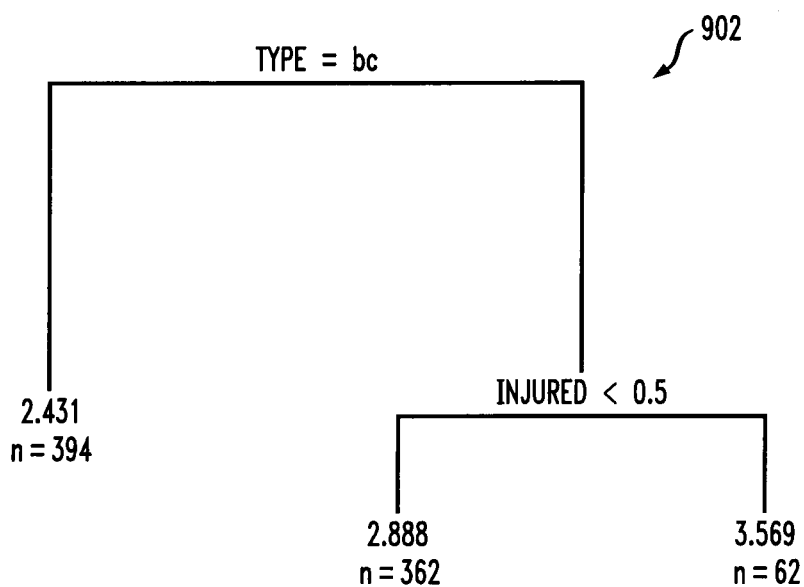
FIG. 9 is a diagram illustrating an example Classification and Regression Tree (CART) tree-structure based on training data, according to an embodiment of the present invention.

Also, FIG. 9 is a diagram illustrating an example CART tree-structure 902 based on training data, according to an embodiment of the present invention. As noted, the first nodes are incident type and the presence of an injury. The predictors in URP tree2 (FIG. 6) were used as the set of descriptors for each incident in KNN. The split is beneath each intermediate node. Types a, b and c represent collision, disabled vehicle and hazard, respectively. The number beneath each terminal node is the predicted logarithm of incident duration.

Table 4 reports measures of predictive accuracy for the examined methods. The URP trees, and specifically the noted example hybrid tree-based quantile regression in accordance with an embodiment of the invention, reduced error as compared to KNN and CART. URP tree1 yielded improved prediction accuracy compared to URP tree2, demonstrating that the incorporation of traffic data provides increased predictive power to the model. By replacing the mean in the final nodes of tree2 by quantile regression models, the forecasting accuracy (measured by MAPE2) on each terminal node was improved on average by 15%, as can be further observed in FIG. 7. To better visualize the difference between 0.5 and 0.9 quantile estimates, the corresponding predictions are plotted in FIG. 8; the average ratio of 0.9 and 0.5 quantile estimates is 2.29.

TABLE 4

Evaluation of predictive error with different methods.

| | KNN | CART | URP tree2 (calibration without traffic data) | URP tree1 (calibration with traffic data) | Hybrid tree-based quantile reg. (missing half of traffic info. in test data) | Hybrid tree-based quantile reg. (with all traffic info. in test data) |
|---|---|---|---|---|---|---|
| MAE1 (min) | 9.77 | 9.62 | 9.51 | 9.30 | 8.78 | 8.52 |
| MAPE1 (%) | 59.2% | 57.1% | 56.41% | 53.77% | 51.4% | 49.5% |
| MAE2 (min) | 6.2 | 6.02 | 5.76 | 5.78 | 5.27 | 5.13 |
| MAPE2 (%) | 42.2% | 42.2% | 40.31% | 40.14% | 36.6% | 34.5% |

In practice, incidents can occur in locations where no detector is installed. To address prediction without traffic data, at least one embodiment of the invention includes calibrating quantile regression models on the final nodes of tree2 without traffic information. If the reported incident has no associated traffic information, a hybrid model can be implemented without traffic data; otherwise, the original regression models can be applied.

By way of illustration and example, the performance of a hybrid tree missing half of traffic information in test data was tested and is also shown in Table 4. On average, to the performance only degrades about 2% in terms of both MAPE1 and MAPE2, and still outperforms other approaches.

Also, for example, an alternative measure of effectiveness is related to a certain tolerance of the prediction error. Accordingly, Table 5 reports accuracy in terms of tolerance levels.

TABLE 5

Percentage of test samples in different prediction tolerances.

| Prediction error | KNN | CART | URP tree2 (calibration without traffic data) | URP tree1 (calibration with traffic data) | Hybrid tree-based quantile reg. (with missing half of traffic info. in test data) | Hybrid tree-based quantile reg. (with all traffic info. in test data) |
|---|---|---|---|---|---|---|
| <=5 min | 42.8% | 42.6% | 43.2% | 43.4% | 47.3% | 49.7% |
| <=10 min | 69.1% | 70.1% | 70.1% | 70.9% | 73.3% | 72.3% |
| <=15 min | 82.5% | 82.4% | 82.8% | 83.4% | 85.1% | 84.6% |
| <=30 min | 94.2% | 94.6% | 94.9% | 94.9% | 94.7% | 95.2% |
| <=60 min | 98.8% | 99.2% | 99.2% | 99.2% | 99.0% | 99.1% |

Five levels were used: 5, 10, 15, 30, and 60 minutes (min). As illustrated, about 50% of incidents have been predicted with less than 5 min prediction error with hybrid tree-based quantile regression, while other methods reached at most 44%. For the ranges of prediction error under 5 min, 10 min, and 15 min, URP clearly outperforms the other methods.

Figure 10:
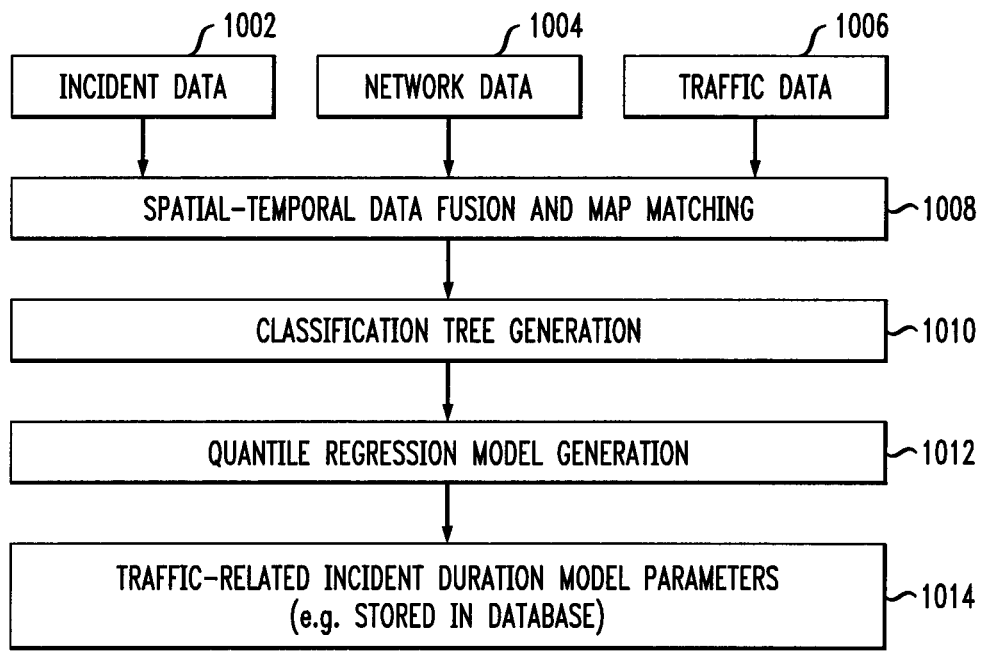
FIG. 10 is a diagram illustrating an example embodiment, according to an aspect of the invention.
Figure 10:
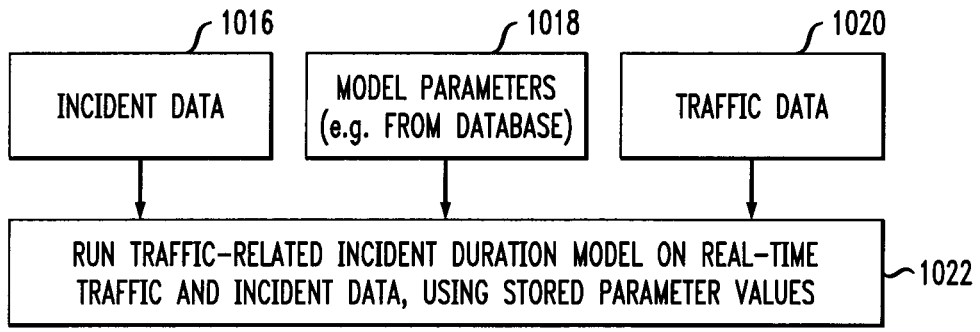

FIG. 10 is a diagram illustrating an example embodiment, according to an aspect of the invention. By way of illustration, FIG. 10 depicts two phases: an offline calibration and model building phase and a real-time online phase. In the offline model calibration phase, incident data 1002, network data 1004 and traffic data 1006 provide input to a spatial-temporal data module to perform a spatial-temporal data fusion and map matching in step 1008. Subsequently, a classification module generates a classification tree in step 1010 and a regression model module generates a quantile regression model in step 1012. Further, traffic-related incident duration model parameters are generated (via a parameters module) and stored in a database in step 1014.

In the real-time online phase, incident data 1016, model parameters 1018 and traffic data 1020 provide input to run a traffic-related incident duration model on real-time traffic and incident data in step 1022, using stored parameter values.

Figure 11:
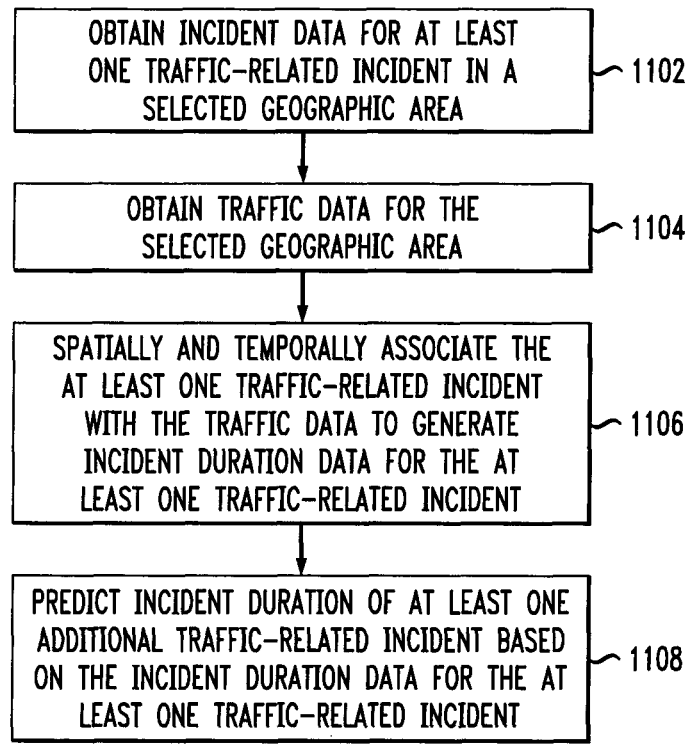
FIG. 11 is a flow diagram illustrating techniques for incident duration prediction, according to an embodiment of the invention.

FIG. 11 is a flow diagram illustrating techniques for incident duration prediction, according to an embodiment of the present invention. Step 1102 includes obtaining incident data for at least one traffic-related incident in a selected geographic area. Incident data can include, for example, incident severity, incident clearance time, etc. Obtaining incident data for at least one traffic-related incident in a selected geographic area can include obtaining incident data from a highway monitoring entity, as well as obtaining incident data from a source providing incident type and corresponding spatio-temporal information. Obtaining incident data can further include classifying incident types into groups such as collision, disabled vehicle and traffic hazard. Additionally, obtaining incident data can include obtaining incident data from a source providing details on incident characteristics.

Step 1104 includes obtaining traffic data for the selected geographic area. Obtaining traffic data for the selected geographic area can include obtaining traffic data from a road surveillance system. Traffic data can include an environmental condition, sequential traffic measurements for the geographic area, at least one temporal indicator (such as time of day and/or day of the week), etc.

Step 1106 includes spatially and temporally associating the at least one traffic-related incident with the traffic data to generate incident duration data for the at least one traffic-related incident. Spatially associating the traffic-related incident with the traffic data can include matching the at least one incident with a closest traffic data record (for example, underground loop detector and fleet-based global positioning system (GPS) sources) that satisfies a location description of the at least one incident. An example embodiment of the invention can also include identifying at least one upstream traffic detector and at least one downstream traffic detector from the closest traffic detector that satisfies a location description of the incident.

Temporally associating the traffic-related incident with the traffic data can include applying an incident detection algorithm to trace a difference in occupancy between adjacent traffic detectors through time and to detect an incident when the difference changes. The incident detection algorithm associates incident data with upstream and downstream traffic data, locates a time stamp when a shockwave hits a nearest upstream detector, and records traffic data before and after the incident's time of occurrence.

Step 1108 includes predicting incident duration of at least one additional traffic-related incident based on the incident duration data for the at least one traffic-related incident. Predicting incident duration of at least one additional traffic-related incident based on the incident duration data for the at least one traffic-related incident can include implementing a hybrid predictive model that combines an algorithm for recursive partitioning based on at least one permutation test with a quantile regression model. Also, at least one embodiment of the invention can include calibrating a quantile regression model without traffic data.

The techniques depicted in FIG. 11 can additionally include incorporating traffic data from before and after the at least one incident occurrence.

Further, the techniques depicted in FIG. 11 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a spatial-temporal data module, a classification module, a regression model module, and a parameters module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 11 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 12:
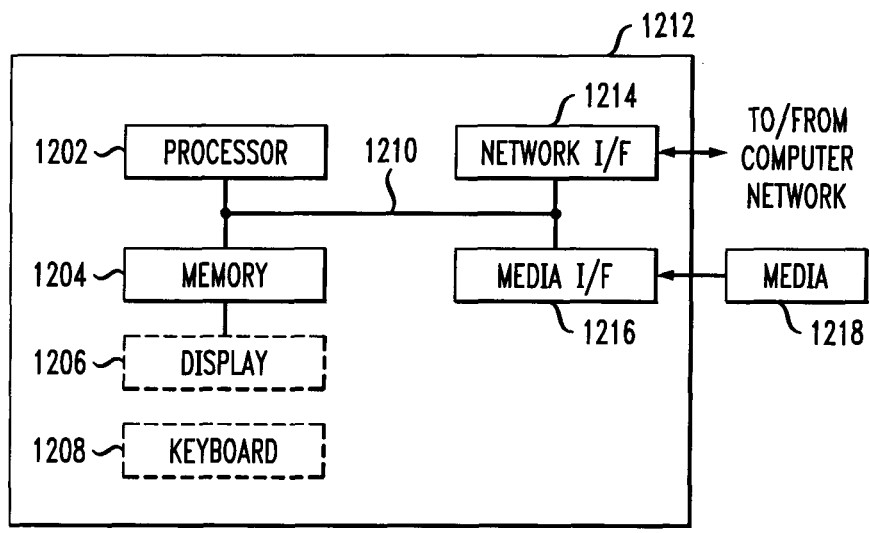
FIG. 12 is a system diagram of an exemplary computer system on which at least one embodiment of the invention can be implemented.

Additionally, an aspect of the present invention can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during to implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1202. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof: for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, facilitating quantification of the effects of various incident and traffic characteristics that determine incident duration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for incident duration prediction carried out by a computing device via a computer-aided dispatch system module, a traffic measurement detector system module, a spatial-temporal module, and a regression model module, wherein the method comprises: obtaining incident data for at least one traffic-related incident in a selected geographic area, wherein said incident data comprises incident type, one or more incident characteristics, and spatio-temporal information corresponding to the at least one traffic-related incident, wherein said obtaining incident data is carried out by the computer-aided dispatch system module executing on the computing device; obtaining traffic data in real-time for the selected geographic area from a system of one or more traffic measurement detectors; spatially and temporally associating the at least one traffic-related incident with the traffic data to generate incident duration data for the at least one traffic-related incident, wherein said spatially and temporally associating is carried out by the spatial-temporal module executing on the computing device; and predicting incident duration of at least one additional traffic-related incident using one or more regression models, wherein said predicting is based on the incident duration data for the at least one traffic-related incident and incident type, one or more incident characteristics, and spatio-temporal information corresponding to the at least one additional traffic-related incident via implementing a hybrid predictive model that combines an algorithm for recursive partitioning based on at least one permutation test with a quantile regression model by employing a regression tree wherein a regression model is fitted to each final node of the tree to provide predicted values of incident duration, and wherein said predicting is carried out by the regression model module executing on the computing device.

2. The method of claim 1, wherein obtaining incident data further comprises classifying incident types into at least one group.

3. The method of claim 2, wherein the at least one group comprises at least one of collision, disabled vehicle and traffic hazard.

4. The method of claim 1, wherein obtaining incident data for at least one traffic-related incident in the selected geographic area comprises obtaining incident data from a source providing details on incident characteristics.

5. The method of claim 1, wherein obtaining traffic data for the selected geographic area comprises obtaining traffic data from a road surveillance system.

6. The method of claim 1, wherein spatially associating the at least one traffic-related incident with the traffic data comprises matching the at least one incident with a closest traffic data record that satisfies a location description of the at least one incident.

7. The method of claim 6, further comprising:
identifying at least one upstream traffic detector and at least one downstream traffic detector from the closest traffic detector that satisfies the location description of the at least one incident.

8. The method of claim 1, wherein temporally associating the at least one traffic-related incident with the traffic data comprises applying an incident detection algorithm to trace a difference in occupancy between adjacent traffic detectors through time and to detect an incident when the difference changes.

9. The method of claim 8, wherein the incident detection algorithm associates incident data with upstream and downstream traffic data, locates a time stamp when a shockwave hits a nearest upstream detector, and records traffic data before and after the at least one incident's time of occurrence.

10. The method of claim 1, wherein the traffic data comprises an environmental condition.

11. The method of claim 1, wherein the traffic data comprises sequential traffic measurements for the geographic area.

12. The method of claim 1, wherein the traffic data comprises at least one temporal indicator.

13. The method of claim 12, wherein the at least one temporal indicator comprises at least one of time of day and day of week.

14. The method of claim 1, wherein the incident data comprises at least one of incident severity and incident clearance time.

15. The method of claim 1, further comprising:
incorporating traffic data from before and after the at least one incident occurrence.

16. A method for incident duration prediction carried out by a computing device via a computer-aided dispatch system module, and a regression model module, wherein the method comprises: obtaining incident data for at least one traffic-related incident, wherein said incident data comprises incident type, one or more incident characteristics, and spatio-temporal information corresponding to the at least one traffic-related incident, and wherein said obtaining incident data is carried out by the computer-aided dispatch system module executing on the computing device; predicting incident duration of at least one additional traffic-related incident based on the incident data for the at least one traffic-related incident and incident type, one or more incident characteristics, and spatio-temporal information corresponding to the at least one additional traffic-related incident by implementing a predictive model that combines an algorithm for recursive partitioning based on at least one permutation test with a quantile regression model by employing a regression tree wherein a regression model is fitted to each final node of the tree to provide predicted values of incident duration, and wherein said predicting is carried out by the regression model module executing on the computing device; and calibrating the quantile regression model without traffic data to predict the incident duration of the at least one additional traffic-related incident without traffic data, wherein said calibrating is carried out by the regression model module executing on the computing device.

17. An article of manufacture comprising a computer readable storage medium having computer readable instructions tangibly embodied thereon which, when implemented, cause a computing device to carry out a plurality of method steps via a computer-aided dispatch system module, a traffic measurement detector system module, a spatial-temporal module, and a regression model module, said plurality of method steps comprising: obtaining incident data for at least one traffic-related incident in a selected geographic area, wherein said incident data comprises incident type, one or more incident characteristics, and spatio-temporal information corresponding to the at least one traffic-related incident, wherein said obtaining incident data is carried out by the computer-aided dispatch system module executing on the computing device; obtaining traffic data in real-time for the selected geographic area from a system of one or more traffic measurement detectors; spatially and temporally associating the at least one traffic-related incident with the traffic data to generate incident duration data for the at least one traffic-related incident, wherein said spatially and temporally associating is carried out by the spatial-temporal module executing on the computing device; and predicting incident duration of at least one additional traffic-related incident using one or more regression models, wherein said predicting is based on the incident duration data for the at least one traffic-related incident and incident type, one or more incident characteristics, and spatio-temporal information corresponding to the at least one additional traffic-related incident via implementing a hybrid predictive model that combines an algorithm for recursive partitioning based on at least one permutation test with a quantile regression model by employing a regression tree wherein a regression model is fitted to each final node of the tree to provide predicted values of incident duration, and wherein said predicting is carried out by the regression model module executing on the computing device.

18. The article of manufacture of claim 17, wherein temporally associating the at least one traffic-related incident with the traffic data comprises temporally associating the at least one traffic-related incident with the traffic data applying an incident detection algorithm to trace a difference in occupancy between adjacent traffic detectors through time and to detect an incident when the difference changes.

19. A system for incident duration prediction carried out by a computing device via a computer-aided dispatch system module, a traffic measurement detector system module, a spatial-temporal module, and a regression model module, comprising: a memory; and at least one processor coupled to the memory and operative for: obtaining incident data for at least one traffic-related incident in a selected geographic area, wherein said incident data comprises incident type, one or more incident characteristics, and spatio-temporal information corresponding to the at least one traffic-related incident, wherein said obtaining incident data is carried out by the computer-aided dispatch system module executing on the computing device; obtaining traffic data in real-time for the selected geographic area from a system of one or more traffic measurement detectors; spatially and temporally associating the at least one traffic-related incident with the traffic data to generate incident duration data for the at least one traffic-related incident, wherein said spatially and temporally associating is carried out by the spatial-temporal module executing on the computing device; and predicting incident duration of at least one additional traffic-related incident using one or more regression models, wherein said predicting is based on the incident duration data for the at least one traffic-related incident and incident type, one or more incident characteristics, and spatio-temporal information corresponding to the at least one additional traffic-related incident via implementing a hybrid predictive model that combines an algorithm for recursive partitioning based on at least one permutation test with a quantile regression model by employing a regression tree wherein a regression model is fitted to each final node of the tree to provide predicted values of incident duration, and wherein said predicting is carried out by the regression model module executing on the computing device.

20. The system of claim 19, wherein the at least one processor coupled to the memory operative for temporally associating the at least one traffic-related incident with the traffic data is further operative for applying an incident detection algorithm to trace a difference in occupancy between adjacent traffic detectors through time and to detect an incident when the difference changes.

* * * * *